(12) United States Patent
Lucchi

(10) Patent No.: US 7,530,455 B2
(45) Date of Patent: May 12, 2009

(54) MODULE WITH LARGE OPEN HINGE FOR EASY CLEANING

(75) Inventor: Marco Lucchi, Munchenstein (CH)

(73) Assignee: Habasit AG, Reinach (CH)

( * ) Notice: Subject to any disclaimer, the term of this patent is extended or adjusted under 35 U.S.C. 154(b) by 99 days.

(21) Appl. No.: 11/781,405

(22) Filed: Jul. 23, 2007

(65) Prior Publication Data

US 2009/0026048 A1    Jan. 29, 2009

(51) Int. Cl.
*B65G 17/06* (2006.01)
(52) U.S. Cl. ..................................................... 198/853
(58) Field of Classification Search ................. 198/853
See application file for complete search history.

(56) References Cited

U.S. PATENT DOCUMENTS

| | | | |
|---|---|---|---|
| 3,269,526 A | * | 8/1966 | Imse et al. .................. 198/853 |
| 3,628,834 A | * | 12/1971 | Anderson .................... 305/159 |
| 5,125,504 A | | 6/1992 | Corlett et al. |
| 5,706,934 A | | 1/1998 | Palmaer et al. |
| D427,898 S | * | 7/2000 | Loh .............................. D8/499 |
| 6,725,883 B2 | | 4/2004 | Guldenfels |
| 6,758,329 B1 | | 7/2004 | Damkjaer et al. |
| 7,367,448 B2 | * | 5/2008 | Fandella ..................... 198/853 |
| 2004/0211651 A1 | * | 10/2004 | Hall ........................... 198/851 |
| 2004/0231966 A1 | * | 11/2004 | Christiana et al. .......... 198/822 |

* cited by examiner

*Primary Examiner*—Mark A Deuble
(74) *Attorney, Agent, or Firm*—Hodgson Russ LLP

(57) ABSTRACT

A belt designed for improved cleanability achieved by large link distances thus reducing the number of gaps. The module design reduces the undesirable elasticity of the belt under load by having link pairs, formed by links on adjacent modules, that are moved as close together as possible leaving large open spaces between the link pairs.

19 Claims, 17 Drawing Sheets

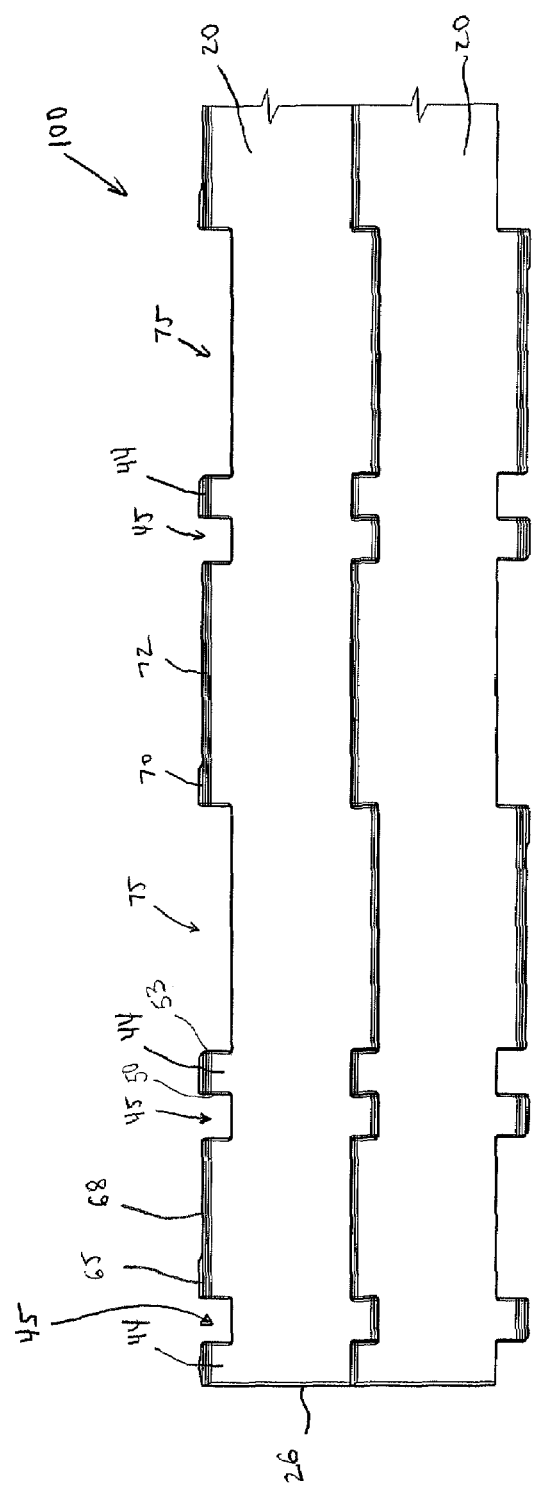

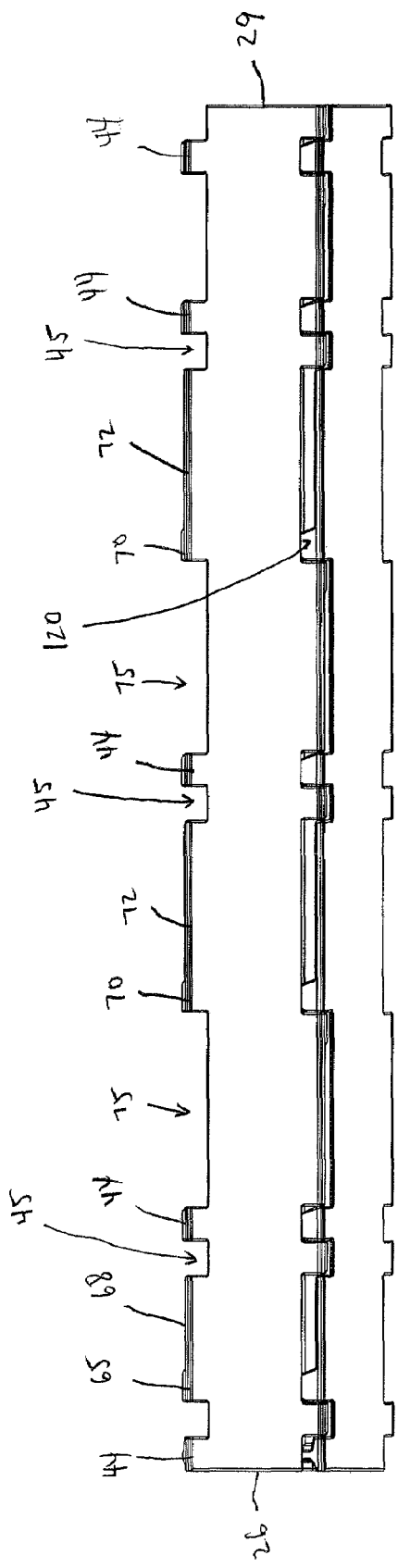

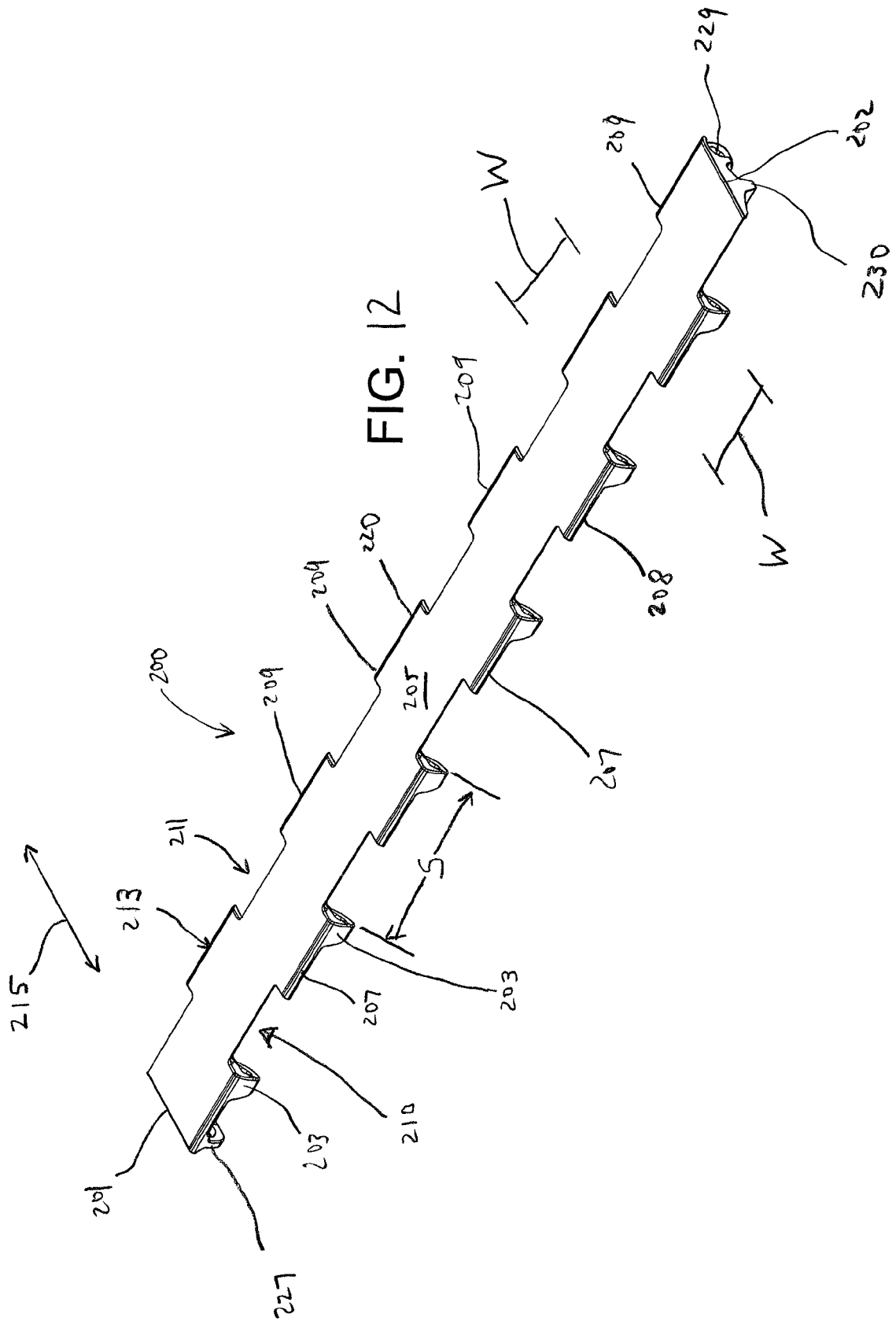

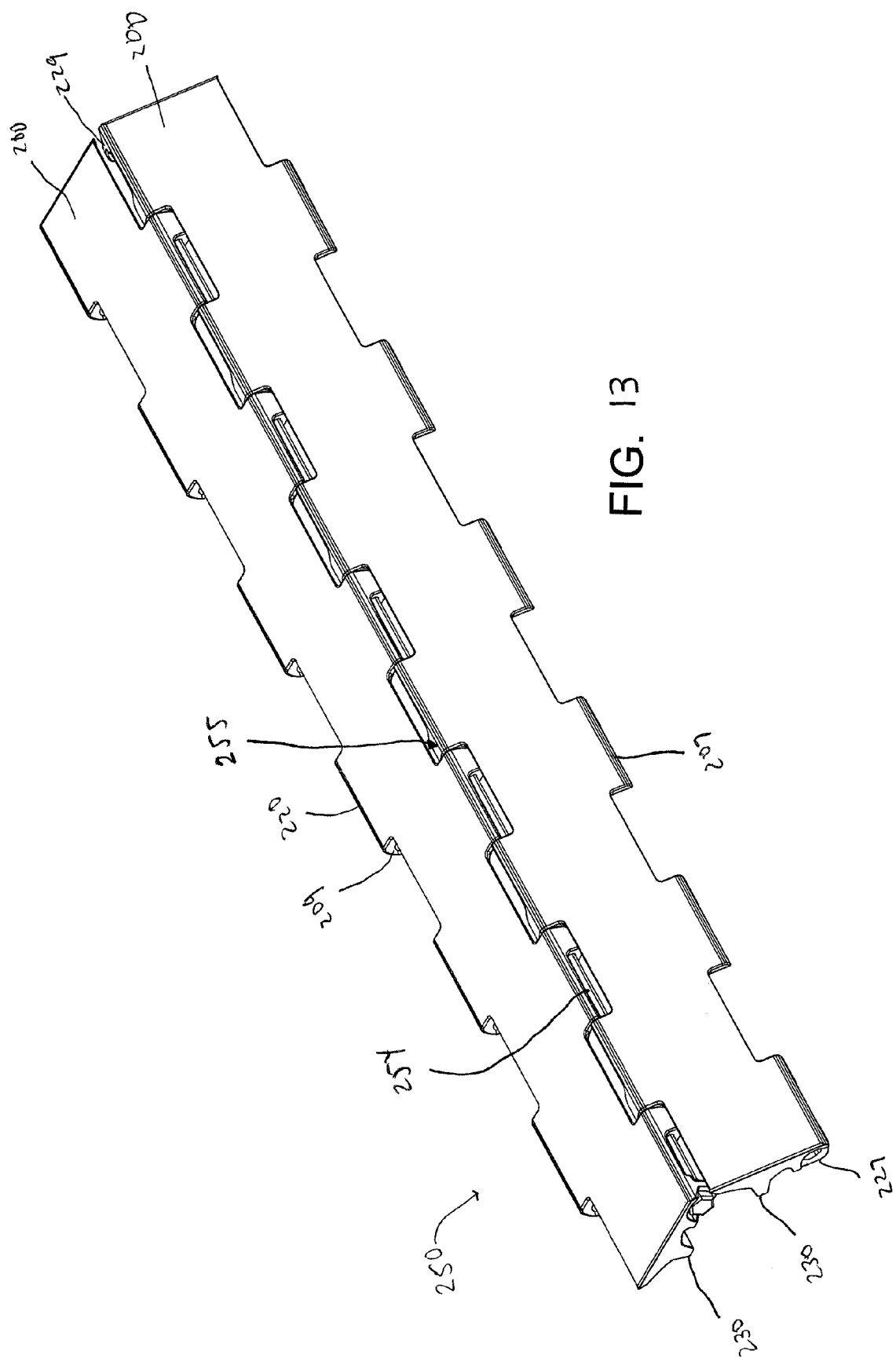

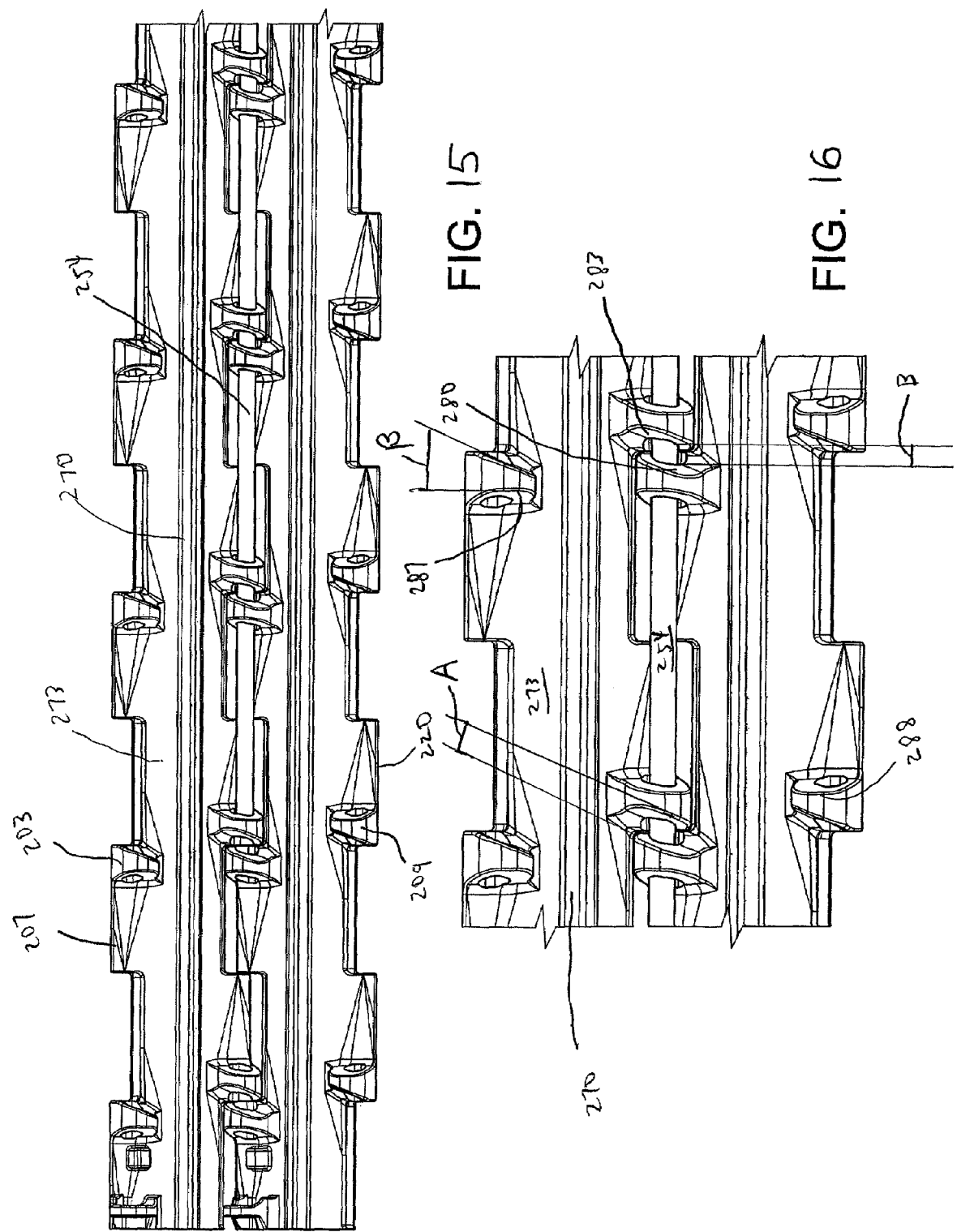

MODULE WITH LARGE OPEN HINGE FOR EASY CLEANING

FIELD OF THE INVENTION

This invention relates to conveyor belts and, more particularly, to modular plastic conveyor belts formed of rows of plastic belt modules pivotally interlinked by transverse pivot rods.

BACKGROUND OF THE INVENTION

Modular belts and particular flat top modular belts are widely used for the transport of foodstuff with direct contact of the foodstuff with the conveying surface of the belt. Belts and equipment for such transport must be regularly cleaned in order to avoid contamination of the food with decomposed residual matters and bacteria.

The modules are usually constructed from plastics that are approved for direct contact with foodstuff. The modules typically have a closed, smooth surface that cleans well. The main area of difficulty is the hinge where the modules are connected together. The hinges typically have gaps where foodstuff can penetrate and become trapped. These residual deposits of foodstuff are difficult to remove. In order to address this problem, there have been designs that provide conical gaps that open when the belt modules move around a sprocket. One such design is shown in U.S. Pat. No. 6,725,883 which is assigned to the assignee of the present invention. Another design is shown in U.S. Pat. No. 5,706,934. These belt designs are further characterized by a smooth flat bottom side that is only interrupted by the links needed to connect the modules to form a belt. In most cases this type of belt is used in a bricklayed assembly of more than one module per module row. These bricklayed belts have small gaps where the module ends meet. In order to eliminate these gaps and as a further improvement in cleanability long modules were used to form a chain-like belt and to eliminate the bricklayed arrangement completely as shown in U.S. Pat. No. 6,758,329. Although the gaps between the module ends are eliminated, these long modules still suffer from a large number of gaps between the equally spaced interdigited links and therefore there was still room for improvement. A further improvement is possible by eliminating some of the links and therefore reducing the number of gaps between the side of the interdigited links. This design offers even better cleanability due to less hinge links but results in low belt strength. The strength reduction is not only caused by the reduction of the number of load transmitting links, but also by the large distance between links. The risk with such a design is the hinge pin, usually made from plastic, being bent between the wider, equally-spaced links and if under load (tension) results in a very flexible and less stable belt. Accordingly, there is a need for a belt module that improves cleanability while maintaining good belt strength.

SUMMARY OF THE INVENTION

The present invention meets the above described need by providing a module that reduces the undesirable elasticity of the belt under load by having link pairs that are moved as close together as possible leaving large open spaces between the link pairs.

BRIEF DESCRIPTION OF THE DRAWINGS

The invention is illustrated in the drawings in which like reference characters designate the same or similar parts throughout the figures of which:

FIG. 2 is a top plan view of a portion of a belt formed from the module shown in FIG. 1;

FIG. 3 is a bottom plan view of the belt of FIG. 2;

FIG. 5 is another perspective view of a portion of the belt as it bends around a sprocket;

FIG. 12 is a perspective view of a belt module according to a second embodiment of the present invention;

FIG. 13 is a perspective view of a belt formed from the module of FIG. 12;

FIG. 15 is a bottom plan view of belt of the present invention as it bends around a sprocket;

FIG. 16 is an enlarged view of a portion of the belt shown in FIG. 15;

DETAILED DESCRIPTION OF THE INVENTION

Figure 1:
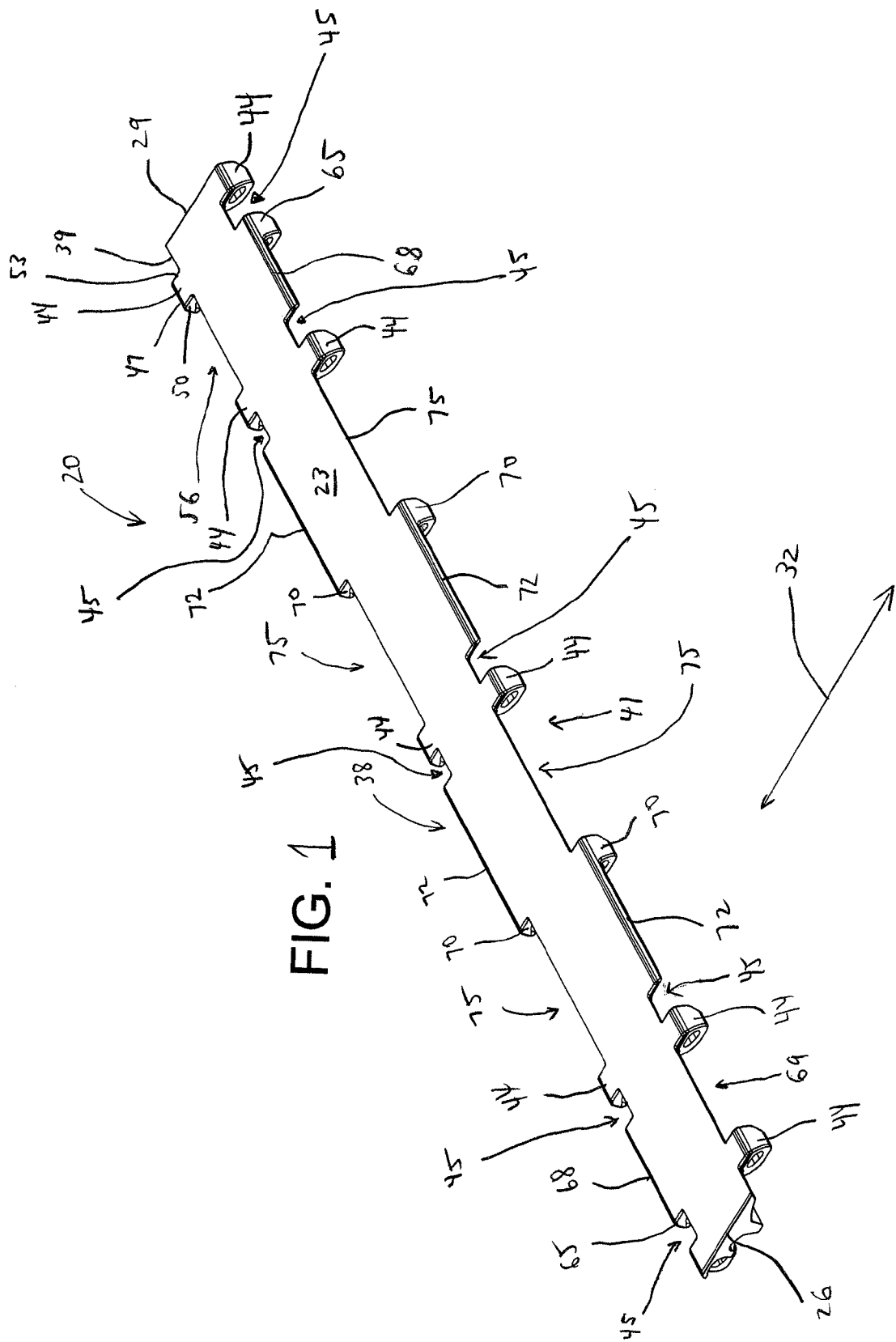
FIG. 1 is a perspective view of a belt module according to a first embodiment of the present invention.

In FIG. 1, a belt module 20 of the present invention has an upper conveying surface 23 that is generally smooth and flat. The upper conveying surface 23 extends from a first side edge 26 to a second side edge 29 in a direction transverse to the direction of belt travel indicated by arrow 32. The upper conveying surface 23 also includes a first edge 38 and a second edge 41 disposed opposite from the first edge 38. The shapes of the first and second edges 38 and 41 are defined by a plurality of link ends and openings. The first edge 38 has a first portion 39 extending in a direction transverse to the direction of belt travel. The first portion 39 extends to a first link end 44. The link end 44 forms a portion of the upper conveying surface 23 and also has a rounded end portion 47. The first link end 44 has a pair of side walls 50 and 53 defining a transverse thickness. On the side of the link end 44 adjacent to side wall 53 there is an elongate opening 56 in the conveying surface 23. The opposite end of the opening 56 is bordered by another link end 44 having a pair of side walls 50 and 53 defining a transverse thickness. The link ends 44 have transverse pivot rod openings 56 (best shown in FIGS. 10-11) for receiving a pivot rod 59 to pivotally connect adjacent modules to form a belt 100 as shown in FIG. 2. On the side of the module 20 opposite from link end 44 a corresponding opening 45 is provided. When adjacent modules 20 are intercalated as shown in FIG. 2, link ends 44 fit into openings 45.

The belt module 20 also includes a link end 65 having a plate 68 extending therefrom. The link end 65 and plate 68 have a width that is slightly smaller than the elongate opening 56 such that adjacent modules 20 are capable of being intercalated and connected by a pivot rod 59 to form a belt 100 capable of articulating around a sprocket (not shown). The belt module 20 also includes a link end 70 that is connected to a wider plate 72. The link end 70 and the wider plate 72 fit into an opening 75 in an adjacent module 20 as shown in FIGS. 2 and 3.

Turning to FIG. 2, the belt 100 may be formed by intercalating adjacent modules 20, aligning their transverse pivot rod openings 56 (FIG. 3), and inserting a pivot rod 59 (FIG. 3), as known to those of ordinary skill in the art based on this disclosure. The belt 100 forms a closed top surface with very minimal gaps to prevent foodstuff from becoming trapped between the belt modules 20. The link ends 44, 65, and 70 on one side of the belt module 20 intercalate with the corresponding openings 45, 69, and 75, on the opposite side of an adjacent belt module 20.

In FIG. 3, the bottom of belt 100 is shown. A longitudinal rib 101 is formed on the bottom surface 103. In order to reduce the undesirable elasticity of the belt under load the link ends are positioned as close together as possible. The target is to reduce the transversal distance B to a minimum. This configuration of the link ends concentrates the shearing forces on the pivot rod 59 into two planes with a very small distance B between them and thus avoids rod bending and reduces belt elasticity. However, the link gap A of the two adjacent links must remain large enough to allow for easy cleaning. The link gap A is created by an angled shaping of the link ends. The gap A between the links is formed by the opposed side walls 106, 109 on adjacent link ends being substantially parallel to each other and disposed at an angle β with respect to the other side wall 112, 115 on each link end. Preferably β is approximately 20 degrees. When the belt 100 moves around a sprocket or drum (not shown), the hinged link ends will rotate around the pivot rod 59 and the hinge gap A will increase releasing any trapped residual matters. The bigger the angle β the more the gap A will increase. The side wall 112, 115 opposite to the angled side wall 106, 109 may be parallel to the direction of belt travel or alternatively may be angled as well as discussed herein. The configuration of the opposite side wall allows for optimization of the link shape to keep sufficient link thickness S at the rearward link end.

Figure 10A:
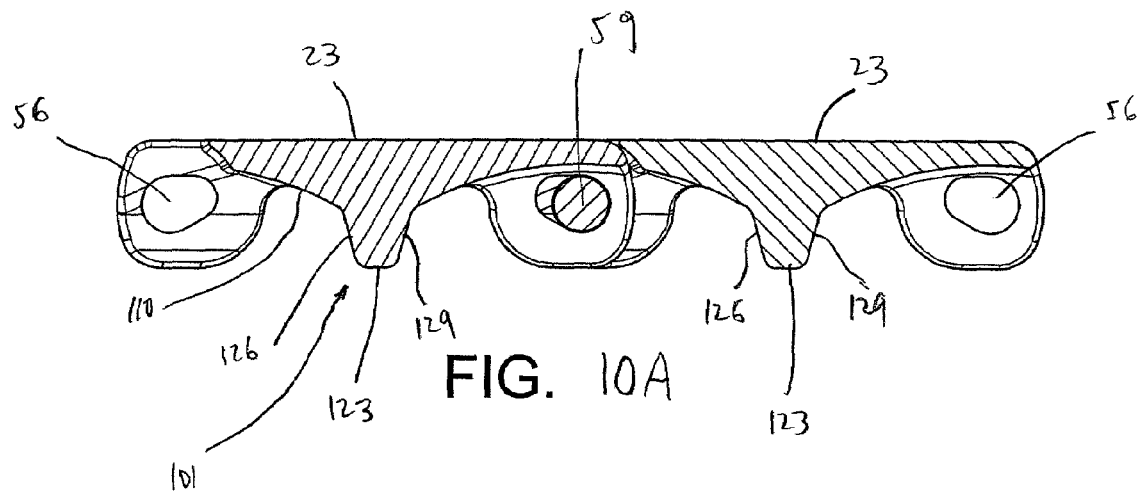
FIG. 10A is a cross-sectional view taken along lines 10-10 of FIG. 8.

From the center cross rib to the leading and trailing edges 38, 41 of the belt 100, the underside of the module 20 may be flat or it may be provided with a plate-like surface (best shown in FIGS. 10A and 11) that slopes away in the direction of belt travel ending at the belt edge between the link ends. As shown in FIG. 10A, the plate-like portion 110 of the module 20 may define a smooth and slightly concave back surface continuing across the module in the direction of belt travel.

Figure 4:
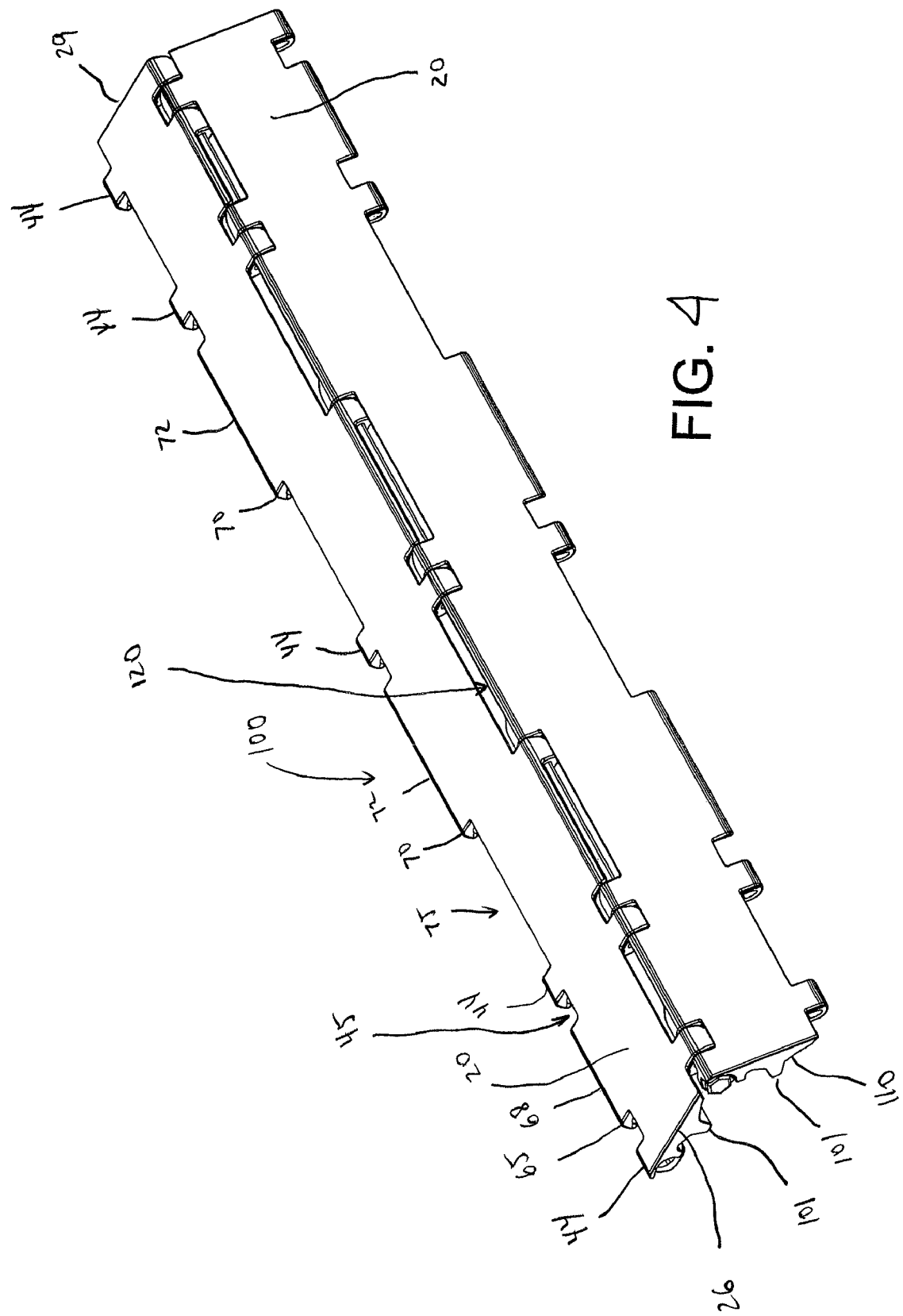
FIG. 4 is a perspective view of a portion of the belt as it bends around a sprocket.

Turning to FIGS. 4-5, when the belt 100 travels around a sprocket or drum, a gap 120 is formed between the edges of adjacent modules 20. The gap 120 provides access to the hinge area for cleaning when the belt 100 travels over the sprocket.

Figure 6:
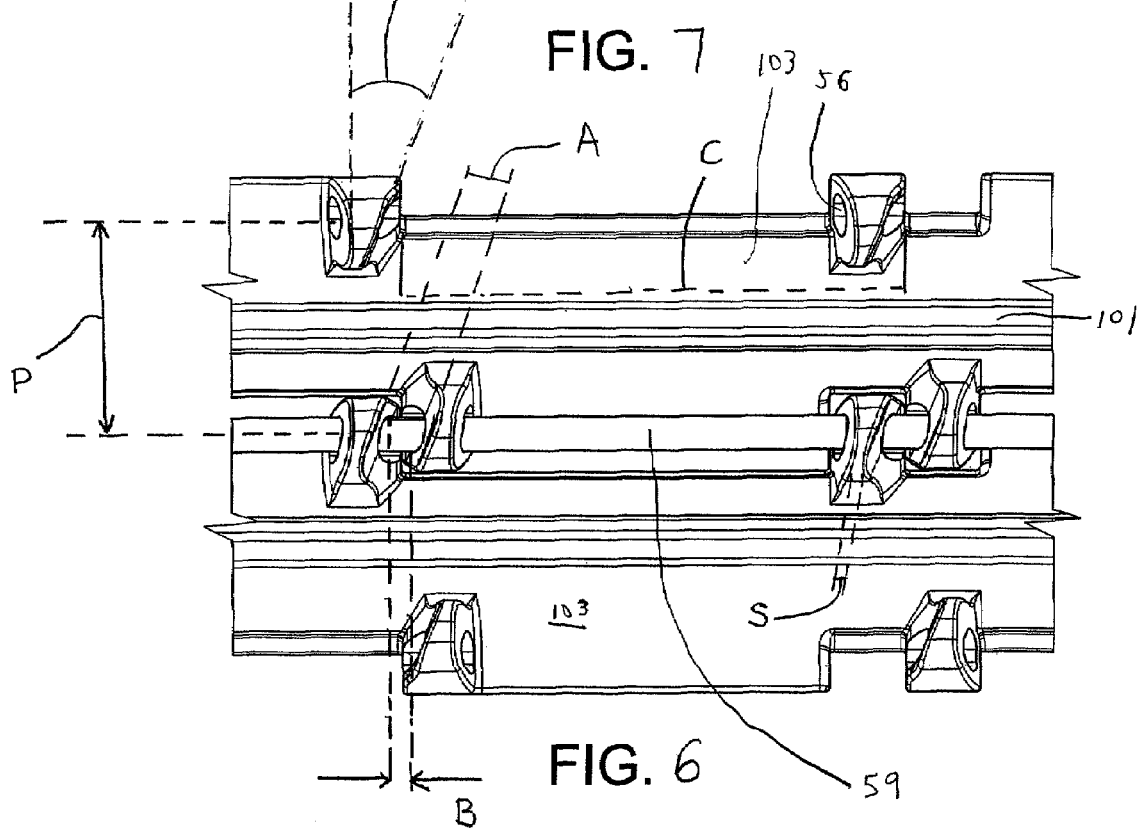
FIG. 6 is an enlarged detailed view taken from FIG. 3.

In FIG. 6, the module pitch P is the distance between the same point on adjacent modules 20 in the direction of belt travel. The link pitch C is the largest distance between the same point on two adjacent link ends. In order to reduce the number of link ends and therefore reduce the number of gaps, the link pitch C may be greater than or equal to the module pitch P. The gap 120 is at its maximum width when the belt 100 is positioned as shown in FIG. 6. In FIG. 6, the belt 100 is rotated around the pivot rod 59 when the belt 100 is turning around a sprocket or drum. The hinge gap A is enlarged due to the bending of the belt 100 around the sprocket.

Figure 7:
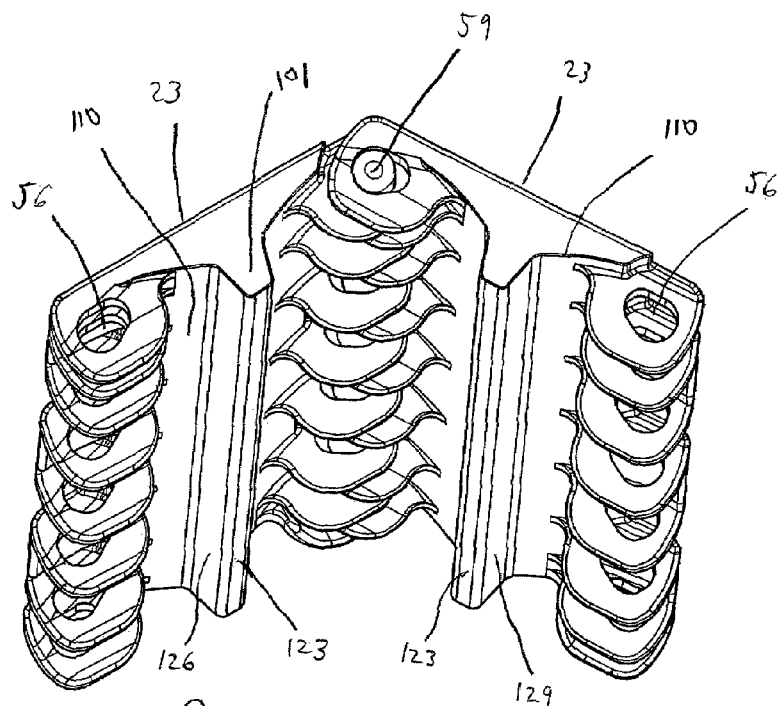
FIG. 7 is an enlarged bottom perspective view of a portion of the belt of the present invention.
Figure 10B:
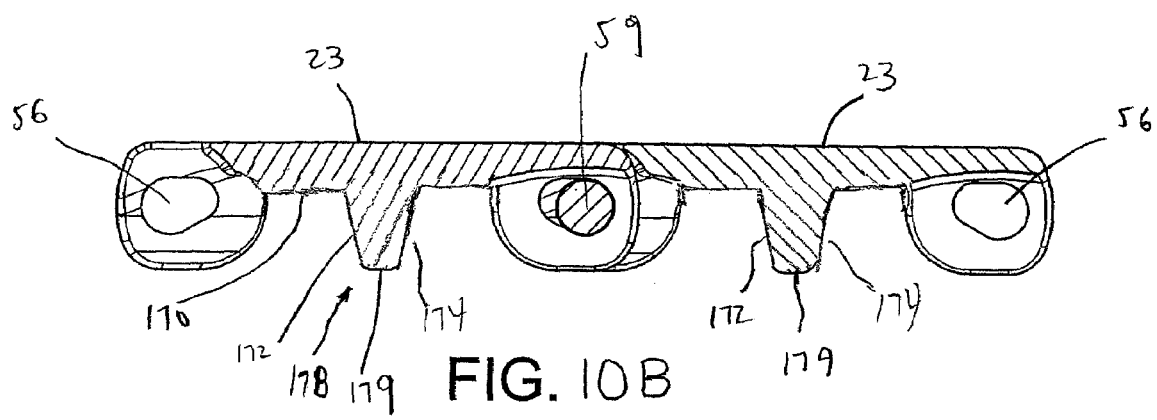
FIG. 10B is an alternate embodiment of the belt of FIG. 10A.

In FIG. 7, a bottom perspective view is shown. The longitudinal rib 101 extends from the bottom surface 103 of the module and provides a point of engagement for the teeth of the sprocket (not shown). The longitudinal rib 101 has a top wall 123 and a pair of side walls 126, 129 extending from opposite sides of the top wall 123. The side walls 126 and 129 extend toward the bottom wall 103 of the module 20. As shown the side walls 126 and 129 intersect with the plate-like portion 110 in a smooth curve that extends from the rib 101 toward the link ends. As an alternative, the side walls 126 and 129 may extend to the bottom surface 103 of the module 20 which may be flat between the base of the rib 101 and the link ends as shown in FIG. 10B and as known to those of ordinary skill in the art based on this disclosure.

Figure 8:
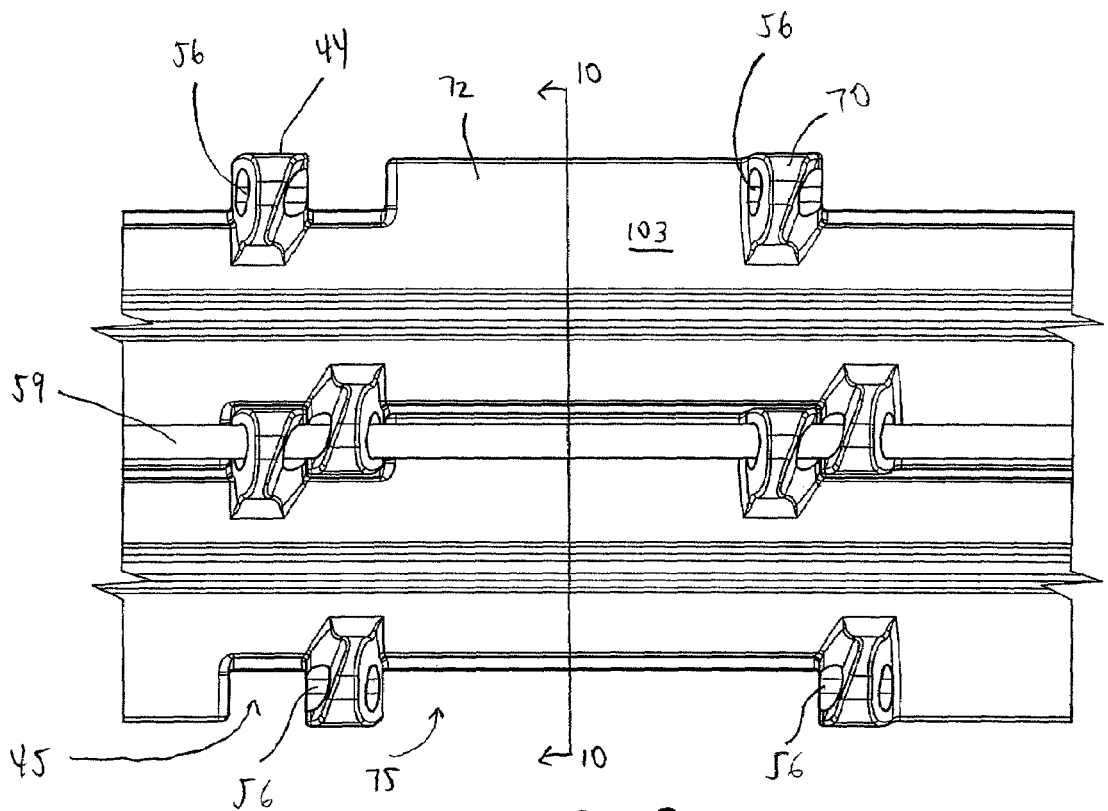
FIG. 8 is a bottom plan view of the belt of the present invention when the top conveying surface is flat.
Figure 9:
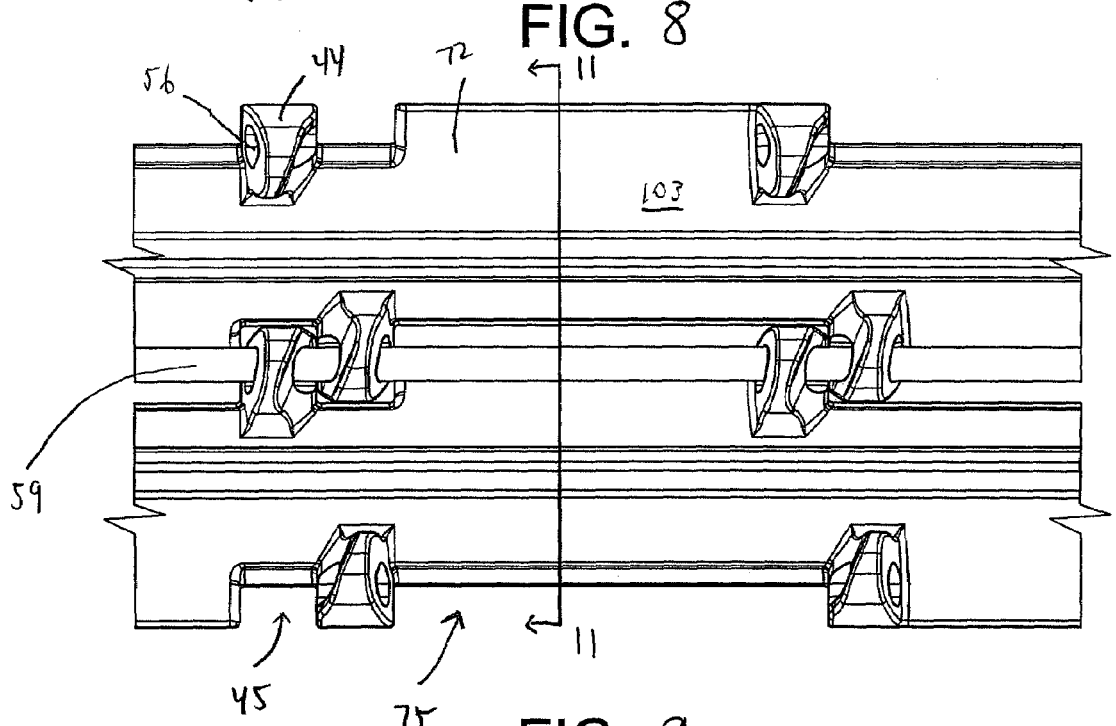
FIG. 9 is a bottom plan view of the belt of the present invention as it bends around a sprocket.

FIG. 8 shows the bottom of the belt 100 when the top conveying surface 23 of the belt 100 is closed. When the belt 100 is travelling along a straight path, the gaps between adjacent modules 20 are minimized and the gaps where foodstuff could pass through the belt surface are minimized. The opposed side walls of the link ends on adjacent modules define the hinge gap A which increases when the belt travels around a sprocket as shown in FIG. 9.

Figure 11:
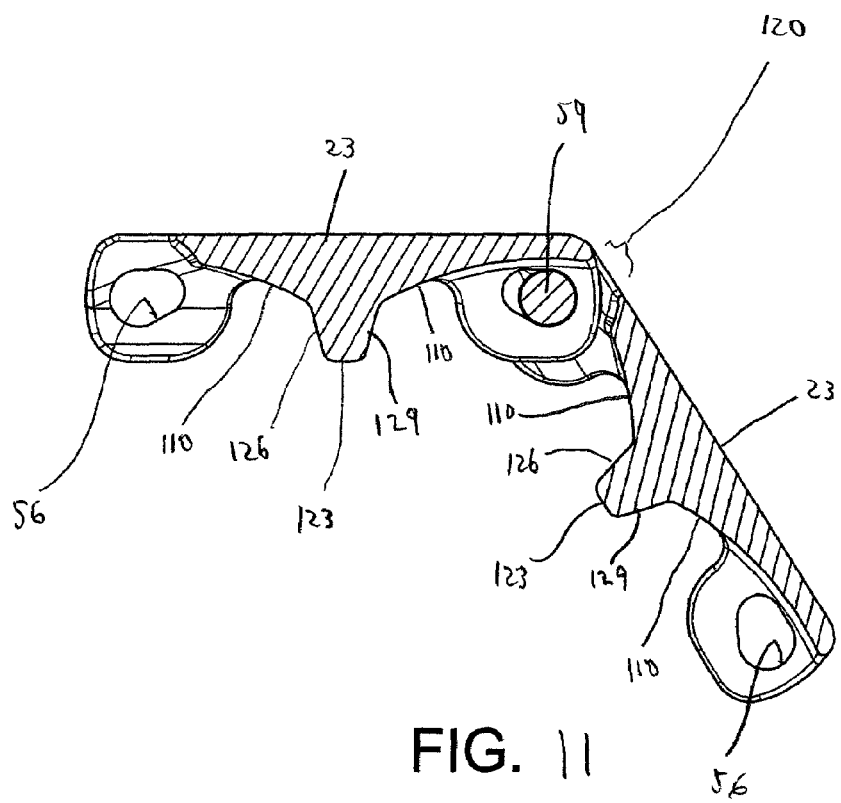
FIG. 11 is a cross-sectional view taken along lines 11-11 of FIG. 9.

As shown in FIG. 10A, the side walls 126, 129 of the longitudinal rib 101 intersect with plate-like portions 110 that extend toward the link ends along a curved path. The pivot rod openings 56 may be provided with an oblong shape with pivot rod openings 56 on opposite sides of the modules being oriented at equal and opposite angles. As a result, a gap is created around the pivot rod to facilitate cleaning. As shown in FIG. 11, the gap widens as the belt passes over the sprocket. FIG. 10B shows an alternate embodiment of the invention with a standard rib 178 having side walls 172 and 174, a top wall 179 and extending to a flat bottom surface 170.

In FIGS. 12-16, an alternate embodiment of the present invention is shown. Belt module 200 has a first side edge 201 and a second side edge 202. A top conveying surface 205 extends between the side edges 201, 202. A first plurality of link ends 203 extend from the conveying surface 205 in the direction of belt travel indicated by arrow 215. A second plurality of link ends 209 extend in the opposite direction. The first plurality of link ends 203 fit into the spaces between the second plurality of link ends 209 on the adjacent module 200. Belt module 200 has plate-like extensions 207, 220 extending from the sides of the link ends 203, 209 with an edge 208, 213 that is sized to extend approximately halfway between neighboring link ends 203, 209 creating a staggered gap when the belt 250 runs around a sprocket. The transversal width W of the edge 208 may of course also be another percentage of the distance between link ends 203. The cleaning properties remain the same for this version, but it may be of advantage for molding and load distribution to the link ends. Link ends 227, 229 are located at or near the side edges 201, 202.

The center cross rib 230 may be in the center axis of the modules equally spaced to the transverse pivot rod openings 235 or may be offset to either side. The cross rib 230 serves for engagement of sprockets to drive the belt. Further it stiffens the link connection to the module and may better accommodate the impact of heavier loads to be conveyed.

Figure 14:
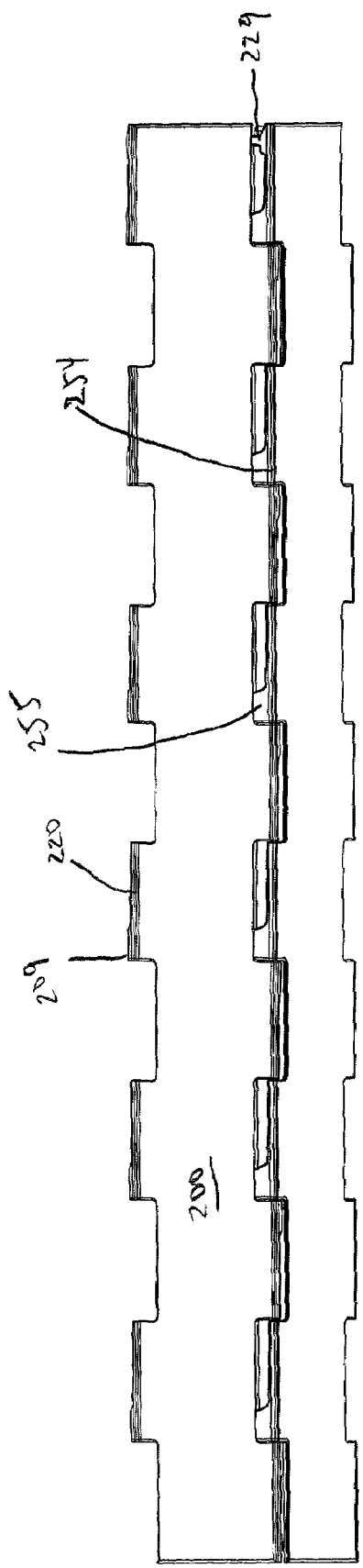
FIG. 14 is another perspective view of the belt shown in FIG. 13.

In FIGS. 13-14 a belt 250 constructed of modules 200 connected by pivot rods 254 is shown as it travels around a sprocket (not shown). Gaps 255 open between the plate-like extensions 207, 220 and the openings between adjacent link ends 203, 209.

Turning to FIGS. 15-16, a longitudinal rib 270 is formed on the bottom surface 273. In order to reduce any undesirable elasticity of the belt under load the link ends are positioned as close together as possible. The target is to reduce the transversal distance B to a minimum. This configuration of the link ends concentrates the shearing forces on the pivot rod 254 in two planes with a small distance B between them and thus avoids rod bending and reduces belt elasticity. However, the link gap of the two adjacent links must remain large enough to allow for easy cleaning. The link gap A is created by an angled shaping of the link ends. The gap A between the links is formed by opposed side walls 280, 283 on adjacent link ends being substantially parallel to each other and disposed at an angle β with respect to the other side wall 287, 288 on each link end. Preferably β is approximately 20 degrees. When the belt 250 moves around a sprocket or drum (not shown), the hinged link ends will rotate around the pivot rod 254 and the hinge gap A will increase releasing any trapped residual matters. The greater the angle β the more the gap A will increase. The side wall 287, 288 opposite to the angled side wall 280, 283 may be parallel to the direction of belt travel or alternatively may be angled as discussed herein. The configuration of the opposite side wall allows for optimization of the link shape to keep sufficient link thickness S at the rearward link end.

Figure 17:
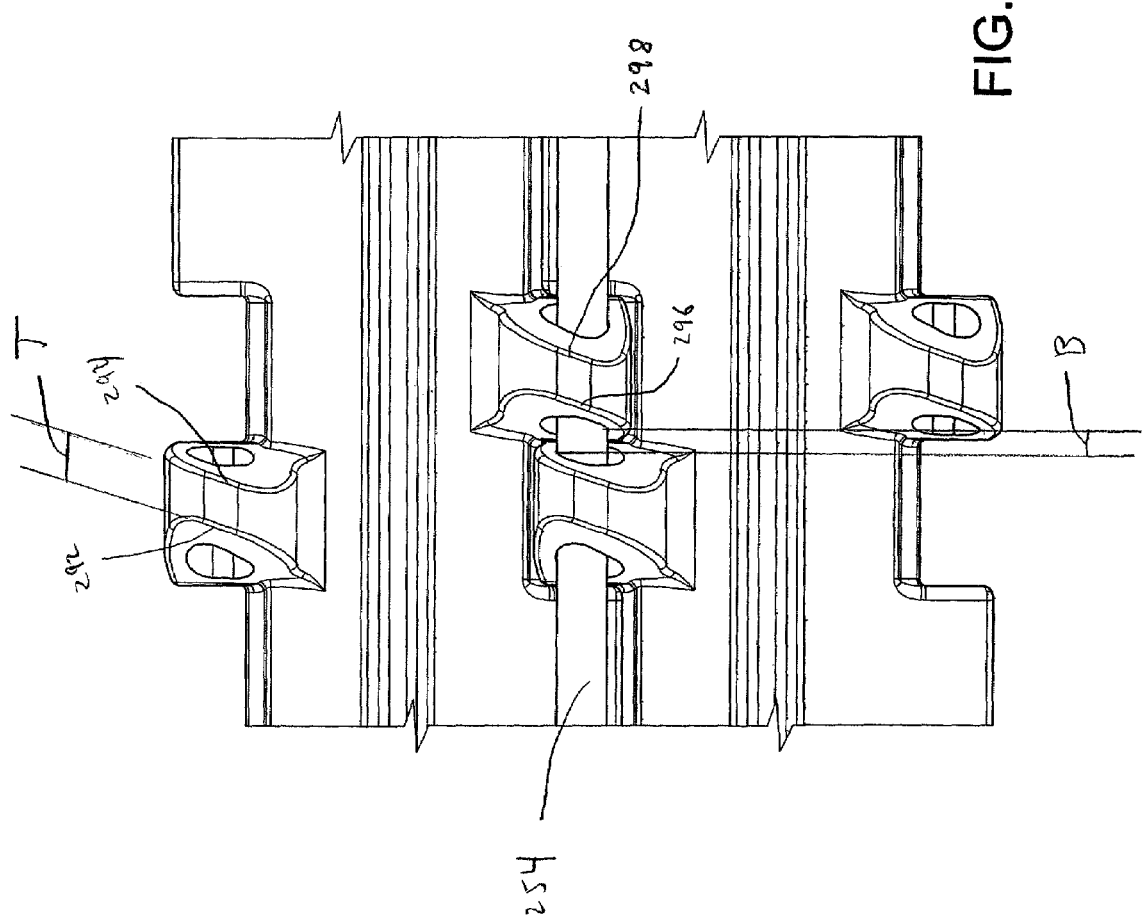
FIG. 17 is a partial bottom plan view of an alternate embodiment of the link ends of the present invention.

In FIG. 17, an alternate embodiment is shown with the link ends being shaped such that all of the side walls 292, 294, 296, and 298 are disposed parallel to each other. By arranging the side walls in this fashion the thickness T of the link end is maintained uniform on the bottom surface.

Figure 18:
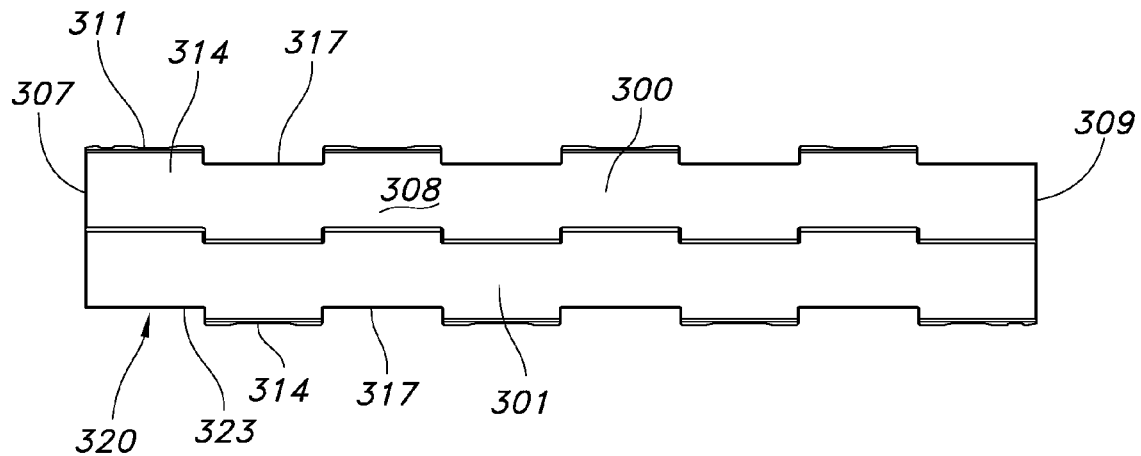
FIG. 18 is a top plan view of a belt according to another embodiment of the present invention.
Figure 19:
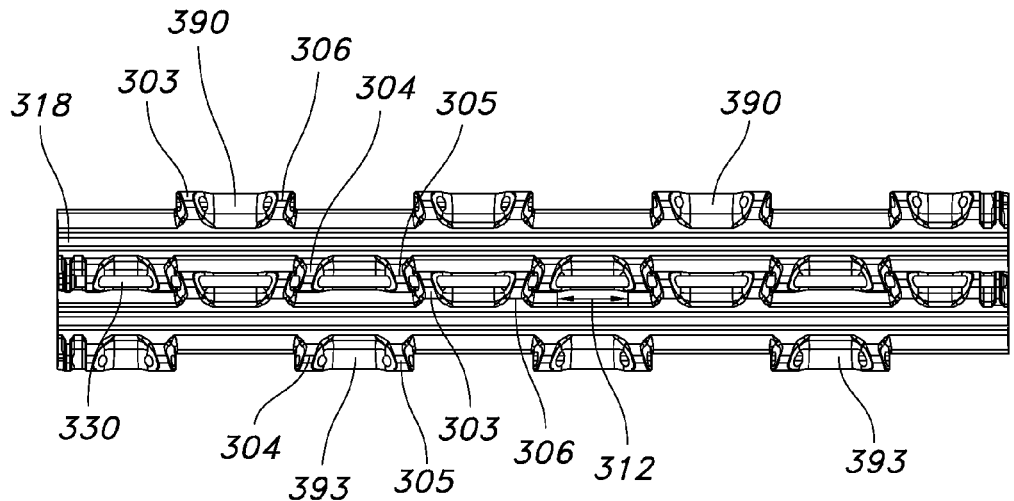
FIG. 19 is a bottom plan view of the belt of FIG. 18.

Turning to FIGS. 18-25, another embodiment of the invention is shown. In FIG. 18, a pair of end-to-end reversible modules 300, 301 are shown. Such modules may be used as chains, particularly in wider width, in order to eliminate the gaps between the modules in the same row of a bricklayed belt. Alternatively, modules 300, 301 may be used to build bricklayed belts. The modules 301, 302 have a closed top surface 308 extending from a first side edge 307 to a second side edge 309. A leading edge 311 includes alternating transverse portions 314 and openings 317 for receiving the transverse portions of adjacent modules. The trailing edge 320 includes a recessed portion 323 leading to successive transverse portions 314 and openings 317. Extending from the trailing edge 320, link ends 303 and 306 are disposed in pairs connected by a plate 390. Extending from leading edge 311, link ends 304 and 305 are connected by a plate 393. The plates 390 and 393 are elongate and have a top surface 394 that is coplanar with top surface 308 of the modules 300, 301. Accordingly, the plates 390, 393 are supported at both sides by the link ends. This arrangement provides the plates 390, 393 with greater impact resistance. The modules 300, 301 may be provided with a longitudinal rib 318 (FIG. 19).

Figure 24:
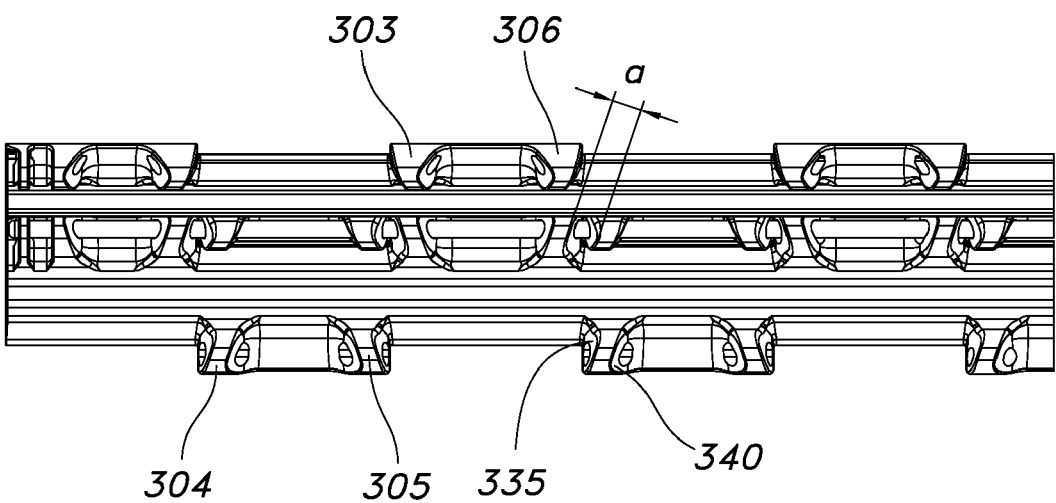
FIG. 24 is an enlarged bottom plan view of the belt in an angled position when the belt is moving around a sprocket or drum.
Figure 25:
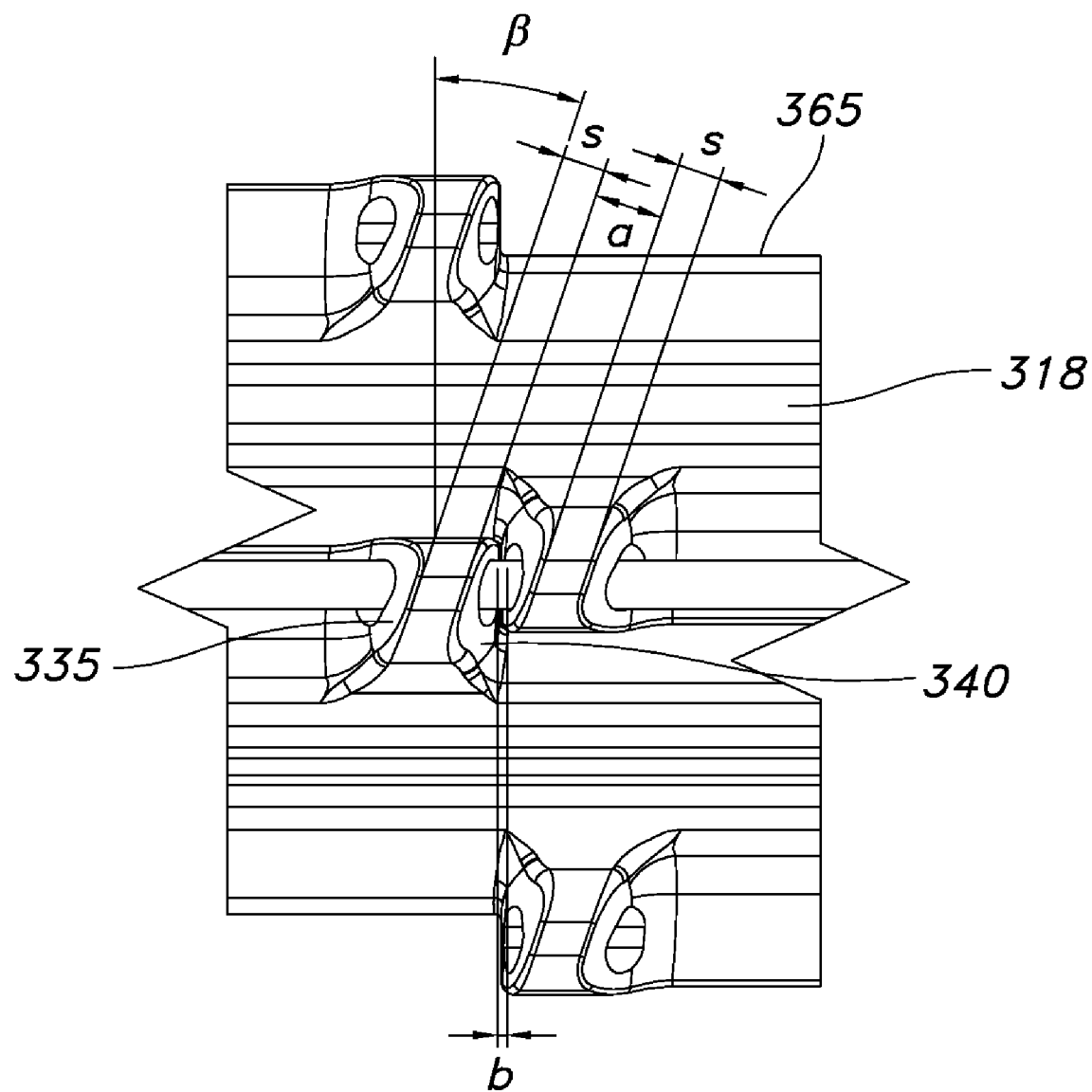
FIG. 25 is an enlarged view of a portion of FIG. 23.

To reduce the undesirable elasticity of the belt under load, widely spaced single links are avoided. Instead the link ends 303, 305 on adjacent modules 300, 301 (FIG. 19) are moved as near together as possible. A large space 312 is left open between the pairs. The target is to reduce the transversal distance b to a minimum, i.e., ideally near zero, as shown in FIG. 25. This configuration concentrates the shearing forces on the pivot rod 330 into two planes with a very small distance b between them, and thus avoids rod bending and reduces belt elasticity. However, the link gap A (FIGS. 23-24) of the neighboring or adjacent links 303, 305 of interconnected modules 300, 301 must remain large enough to allow easy cleaning. This feature is achieved by a very specific angled shaping of the links. The gap between the links are in an angle β in a generally parallel relationship as shown in FIG. 25. Preferably this angle is at least 20 degrees. As shown in FIG. 24, when the belt moves around a sprocket or drum (not shown), the hinged links will rotate around the pivot rod 330 and the hinge gap A will increase, releasing any trapped residual matter. The larger the angle β, the more the gap A will increase. The link face 335 opposite to the angled face 340 may be parallel to the running direction of the belt as discussed above in connection with FIG. 16 or alternatively may be angled as well as best shown in FIG. 25. This variation provides for optimizing the link shape to keep sufficient link thickness S at the rearward link end 360. From the point where the rear end 360 of the links are joining into the module plate, the back surface 355 slopes away in the running direction of the belt ending in between the links at the edge 365. This plate-like portion of the module defines a smooth and slightly concave back-surface 355 allowing the best possible access to inspection and cleaning of the exposed rods 330. The edges 365 meeting with the adjacently linked module body are shaped to open a gap A when the belt moves around a sprocket or drum for access of the cleaning fluid and easy removal of residuals collected in the hinge area.

Figure 20:
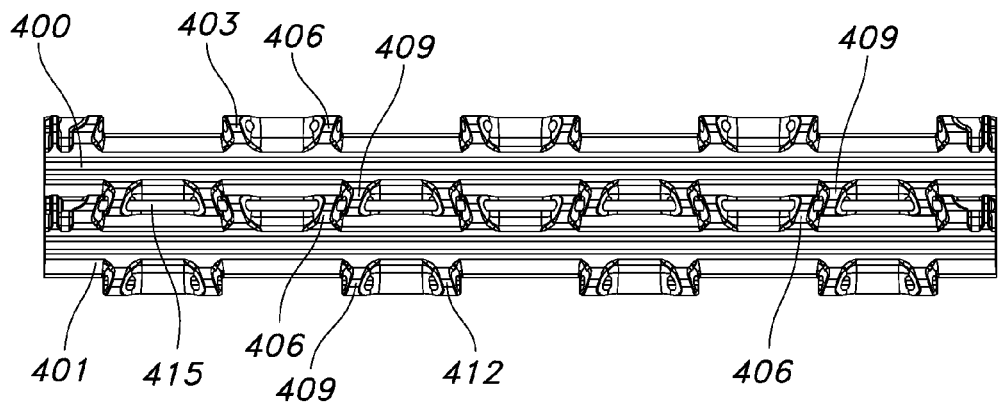
FIG. 20 is a bottom plan view of an alternate embodiment that is not end-to-end reversible.
Figure 21:
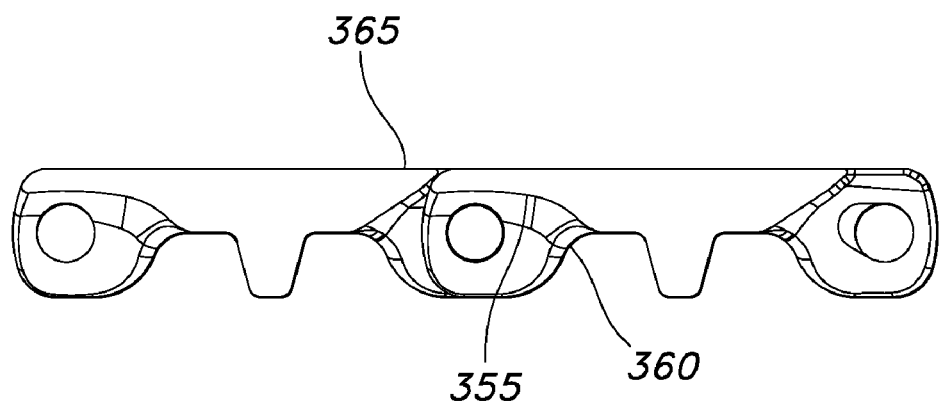
FIG. 21 is an end view of the belt of FIG. 18 in a straight-running, closed configuration.
Figure 22:
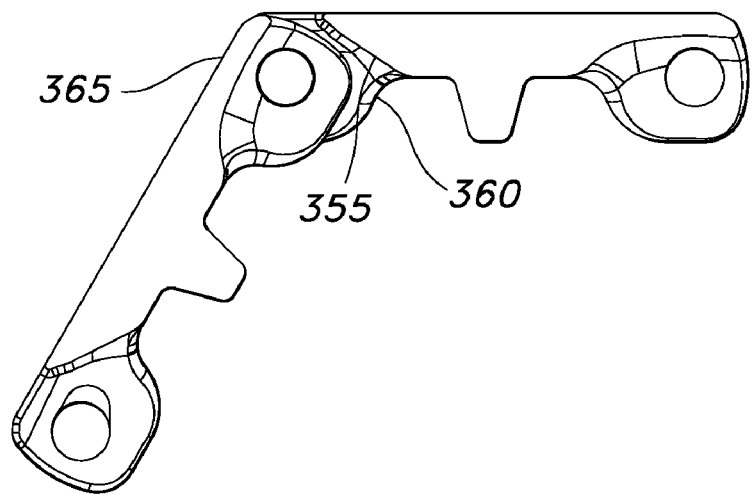
FIG. 22 is an end view of the belt when it moves around a sprocket.
Figure 23:
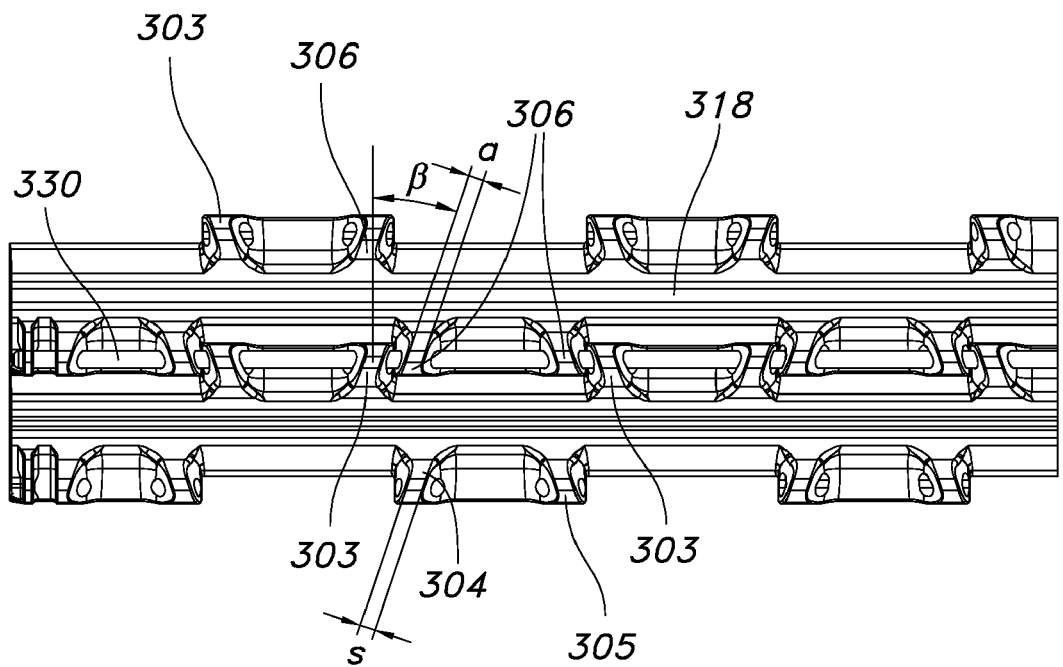
FIG. 23 is an enlarged bottom plan view of the belt in the flat horizontal position.

In FIG. 20, an alternate embodiment of the module that is not end-to-end reversible and therefore cannot be bricklayed is shown. A pair of modules 400, 401 having link ends 403, 406 and 409, 412, respectively are connected by a pivot rod 415. The link ends are disposed in pairs as described above when the modules are connected and the link ends are intercalated.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module, comprising:

an intermediate section extending from a first side edge to a second side edge and having a top conveying surface and a bottom surface;

a first plurality of link ends, the first link ends having a pair of side walls defining a transverse thickness, the first link ends extending from the intermediate section in a direction of belt travel, the first link ends being disposed in pairs connected by an elongate plate having a surface that is coplanar with the top conveying surface;

a second plurality of link ends, the second link ends having a pair of side walls defining a transverse thickness, the second link ends extending from the intermediate section in a direction opposite to the first plurality of link ends, the second link ends being disposed in pairs connected by an elongate plate having a surface that is coplanar with the top conveying surface, the pairs of second link ends having openings defined therebetween for receiving the pairs of first link ends when adjacent modules are intercalated;

wherein the pairs of first link ends are capable of fitting into the openings between the pairs of second link ends of an adjacent module when the modules are intercalated to form a belt, at least one of the first link ends of the module and at least one of the second link ends of an adjacent module being disposed proximate to each other with respect to the transverse direction.

2. The belt module of claim 1, wherein the module further comprises a longitudinal rib.

3. The belt module of claim 1, wherein the modules are capable of being bricklayed.

4. The belt module of claim 1, wherein the module extends the entire width to form a chain.

5. The belt module of claim 1, wherein first and second link ends have side walls that are disposed substantially parallel to each other.

6. The belt module of claim 1, wherein the sidewalls of the first and second link ends are disposed at an acute angle.

7. The belt module of claim 1, wherein the first link end is disposed at an angle $\beta$ with respect to the direction of belt travel.

8. The belt module of claim 1, wherein $\beta$ is 15-30 degrees.

9. The belt module of claim 1, wherein $\beta$ is approximately 20 degrees.

10. A belt module, comprising:
   an intermediate section extending from a first side edge to a second side edge and having a top conveying surface and a bottom surface;
   a first plurality of link ends, the first link ends having a pair of side walls defining a transverse thickness, the first link ends extending from the intermediate section in a direction of belt travel, at least one of the first link ends having an elongate plate extending therefrom, the plate having a surface that is coplanar with the top conveying surface;
   a second plurality of link ends, the second link ends having a pair of side walls defining a transverse thickness, the second link ends extending from the intermediate section in a direction opposite to the first plurality of link ends, at least one of the second link ends having an elongate plate extending therefrom, the plate having a surface that is coplanar with the top conveying surface;
   wherein the first link ends are capable of fitting into openings between the second link ends of an adjacent module when the modules are intercalated to form a belt, the first and second link ends of adjacent modules being disposed proximate to each other with respect to the transverse direction.

11. The belt module of claim 10, wherein the module further comprises a longitudinal rib.

12. The belt module of claim 10, wherein the modules are capable of being bricklayed.

13. The belt module of claim 10, wherein the module extends the entire width to form a chain.

14. The belt module of claim 10, wherein first and second link ends have side walls that are disposed substantially parallel to each other.

15. The belt module of claim 10, wherein the sidewalls of the first and second link ends are disposed at an acute angle.

16. The belt module of claim 10, wherein the first link end is disposed at an angle $\beta$ with respect to the direction of belt travel.

17. The belt module of claim 10, wherein $\beta$ is 15-30 degrees.

18. The belt module of claim 10, wherein $\beta$ is approximately 20 degrees.

19. A modular conveying belt, comprising:
   a first belt module having an intermediate section extending from a first side edge to a second side edge and having a top conveying surface and a bottom surface, a first plurality of link ends, the first link ends having a pair of side walls defining a transverse thickness, a transverse pivot rod opening extending between the pair of side walls, the first link ends extending from the intermediate section in a direction of belt travel, the first link ends being disposed in pairs connected by an elongate plate having a surface that is coplanar with the top conveying surface, a second plurality of link ends, the second link ends having a pair of side walls defining a transverse thickness, the second link ends extending from the intermediate section in a direction opposite to the first plurality of link ends, the second link ends being disposed in pairs connected by a plate having a surface that is coplanar with the top conveying surface, the pairs of second link ends having openings defined therebetween for receiving the pairs of first link ends when adjacent modules are intercalated, wherein the pairs of first link ends are capable of fitting into the openings between the pairs of second link ends of an adjacent module when the modules are intercalated to form a belt, the first and second link ends of adjacent modules being disposed proximate to each other with respect to the transverse direction;
   a second belt module having an intermediate section extending from a first side edge to a second side edge and having a top conveying surface and a bottom surface, a first plurality of link ends, the first link ends having a pair of side walls defining a transverse thickness, a transverse opening extending between the pair of side walls, the first link ends extending from the intermediate section in a direction of belt travel, the first link ends being disposed in pairs connected by a plate having a surface that is coplanar with the top conveying surface, a second plurality of link ends, the second link ends having a pair of side walls defining a transverse thickness, the second link ends extending from the intermediate section in a direction opposite to the first plurality of link ends, the second link ends being disposed in pairs connected by an elongate plate having a surface that is coplanar with the top conveying surface, the pairs of second link ends having openings defined therebetween for receiving the pairs of first link ends when adjacent modules are intercalated, wherein the pairs of first link ends are capable of fitting into the openings between the pairs of second link ends of an adjacent module when the modules are intercalated to form a belt, the first and second link ends of adjacent modules being disposed proximate to each other with respect to the transverse direction;
   a pivot rod disposed through the aligned transverse pivot rod openings of intercalated belt modules.

* * * * *

UNITED STATES PATENT AND TRADEMARK OFFICE
CERTIFICATE OF CORRECTION

PATENT NO. : 7,530,455 B2
APPLICATION NO. : 11/781405
DATED : May 12, 2009
INVENTOR(S) : Lucchi Page 1 of 1

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (99) days Delete the phrase "by 99 days" and insert -- by 97 days --

Signed and Sealed this

Twenty-fifth Day of August, 2009

David J. Kappos
*Director of the United States Patent and Trademark Office*